United States Patent [19]

Swann, Jr.

[11] Patent Number: 4,825,599

[45] Date of Patent: May 2, 1989

[54] SPACE STRUCTURES FORMABLE IN SPACE

[76] Inventor: Jack T. Swann, Jr., 2318 Colony Dr., Huntsville, Ala. 35802

[21] Appl. No.: 4,642

[22] Filed: Jan. 20, 1987

[51] Int. Cl.$^4$ ............................................. E04H 15/20
[52] U.S. Cl. .......................................... 52/2; 342/10; 343/915; 264/45.2
[58] Field of Search ........................ 52/2 E; 342/10; 343/915; 264/46.6, 46.7, 45.2, 60, 257

[56] References Cited

U.S. PATENT DOCUMENTS

| | | | |
|---|---|---|---|
| 2,738,039 | 3/1956 | Hamilton | 52/2 L |
| 2,812,769 | 11/1957 | Schaefer | 52/2 E |
| 3,091,053 | 5/1963 | Growald | 52/2 E |
| 3,098,229 | 7/1963 | Raabe | 52/2 E |
| 3,110,552 | 11/1963 | Voelker | 214/45.2 |
| 3,257,481 | 6/1966 | Chang | 52/2 E |
| 3,277,479 | 10/1966 | Strable | 52/DIG. 10 |
| 3,282,533 | 11/1966 | Spain | 52/2 E |
| 3,326,624 | 6/1967 | Von Maydell | 343/915 |
| 3,327,308 | 6/1967 | Henjum | 342/10 |
| 3,357,142 | 12/1967 | Furrer | 52/2 E |
| 3,668,287 | 6/1972 | Mackie | 264/46.6 |

FOREIGN PATENT DOCUMENTS

| | | | |
|---|---|---|---|
| 507271 | 1/1951 | Canada | 52/2 |
| 913546 | 12/1962 | United Kingdom | 343/915 A |

Primary Examiner—Henry E. Raduazo
Attorney, Agent, or Firm—C. A. Phillips

[57] ABSTRACT

A space structure which is formed in space. The structure is comprised of an expandable, flexible, generally non-elastic, impervious mold which is arranged in a collapsed state in a container which separates in space to expose the mold to the space environment. The mold is formed to a predetermined configuration by the injection of chemically hardenable filler materials. The vacuum properties of space permit very low injection pressures for the injection process, and the non-gravitational properties of space permit the mold to remain substantially sag-free during hardening of the filler materials.

14 Claims, 6 Drawing Sheets

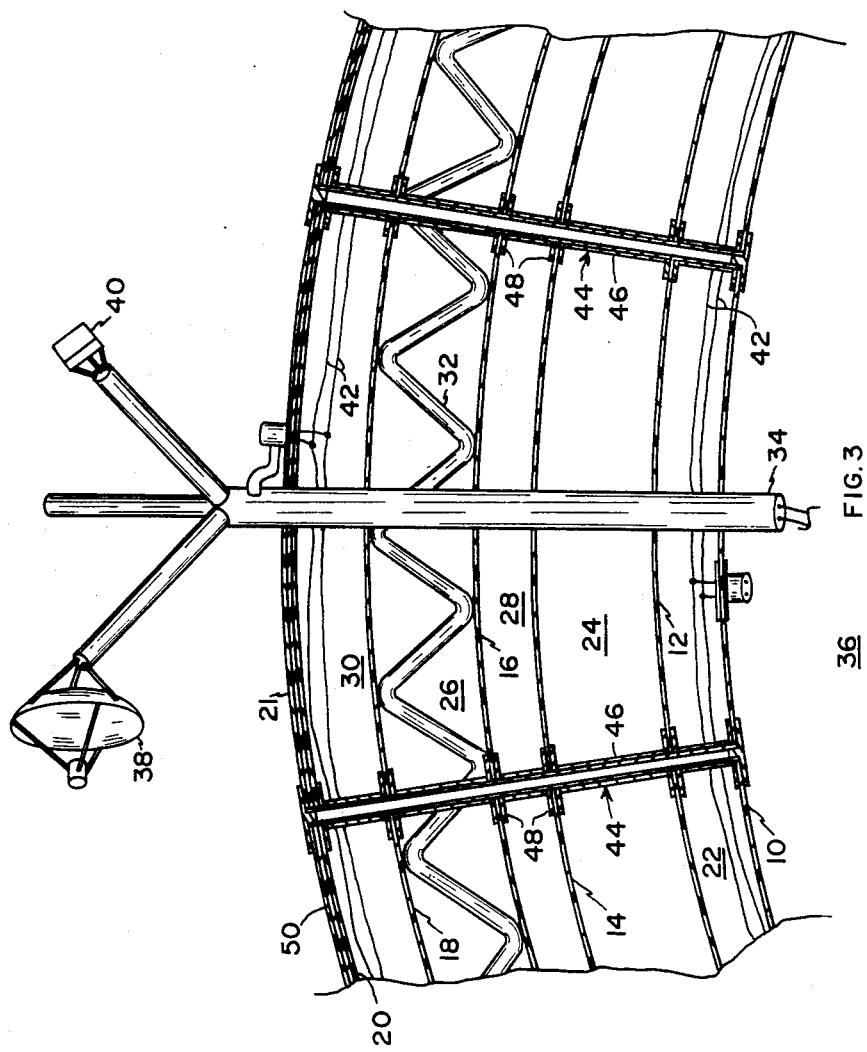
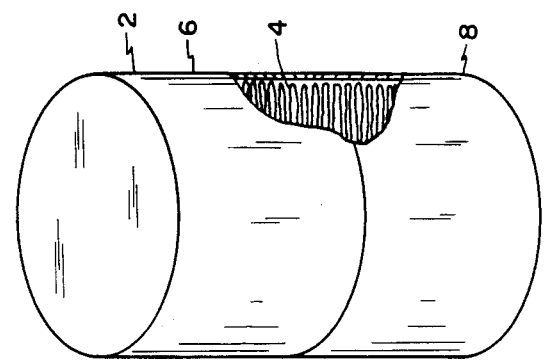
FIG. 1
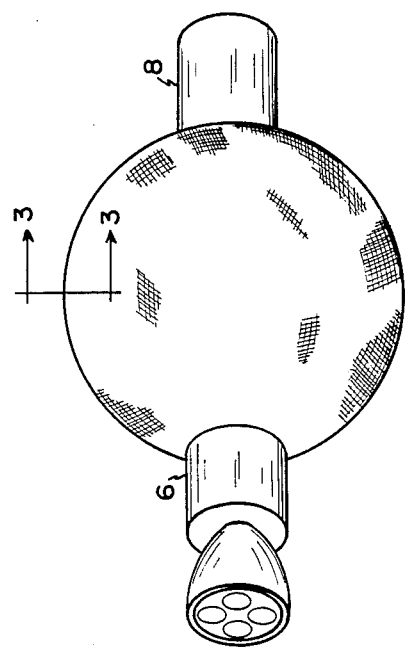
FIG. 2

SPACE STRUCTURES FORMABLE IN SPACE

FIELD OF THE INVENTION

This invention relates generally to large space structures, including environmental habitats, and particularly to such structures which are formed in a mold. The mold is prefabricated on Earth, folded and placed in a container for insertion into a space orbit, and then unfolded and formed once in the space orbit. Forming is accomplished by the injection of chemically hardenable materials in the prefabricated, collapsable mold.

BACKGROUND OF THE INVENTION

Presently it is proposed to build large structures in space by partially assembling by welding, bolting, etc., large structural components together and then transporting the partially assembled components into space where the components are to be assembled to complete the space structure. Such approach requires many launchesa, including space trips to insert the components into orbit and space trips to insert the men and tools into orbit with the components to complete the assembly. The device of the present invention utilizes the properties of space for the construction of large structures, including environmental habitats and/or protective shells, etc., without regarding excessive launches and without requiring men to be in orbit for long periods of time to complete the construction. For structures such as habitats, the use of man-hours in space suits are minimized. The internal construction is done in an enclosed space which is inflated by breathable gases to provide an Earth-like environment, with no requirement for space suits.

SUMMARY OF THE INVENTION

In accordance with this invention, the properties of space, specifically, a vacuum environment and no effective gravity for orbiting bodies, are utilized for the construction of environmental habitats, protective shells, and reinforcing structures for such things as equipment and people. The space structure includes a flexible, non-permeable, generally non-elastic mold having a predetermined configuration. The mold is placed in a container in a folded or collapsed state, on Earth, and formed to its predetermined configuration by injection of chemically hardenable materials therein once in orbit. The vacuum condition of space allows the mold, of film and/or sheet and/or fabric, to hold its shape using very low pressure, and the lack of gravity ensures a substantially sag-free mold while the chemically hardened materials are injected ito the mold and allowed to harden to from the space structure. The structure may be spherical, or it may have any desired configuration. Apparatus is provided for separately storing and also for mixing the materials prior to injection thereof into the mold.

BRIEF DESCRIPTION OF THE DRAWINGS

FIG. 1 is a pictorial view of a cylindrical canister which may be utilized as an enclosure for the space structure mold of the present invention.

FIG. 2 is a view of the canister of FIG. 1 illustrating an embodiment of the invention with the canister in its separated condition and with a spherical mold exposed to space and formed to its final predetermined configuration. A space vehicle is shown utilizing one end section of the canister as a docking facility.

FIG. 3 is a partial sectional view taken along line 3—3 of FIG. 2 illustrating an embodiment of the invention with the space structure constructed in layers and forming an environmental habitat.

FIG. 4 illustrates the storage tank having an inner container fully expanded by the materials therein. FIG. 5 illustrates a semi-collapsed state of the container as the materials are being discharged.

DESCRIPTION OF THE PREFERRED EMBODIMENT

Figure 4:
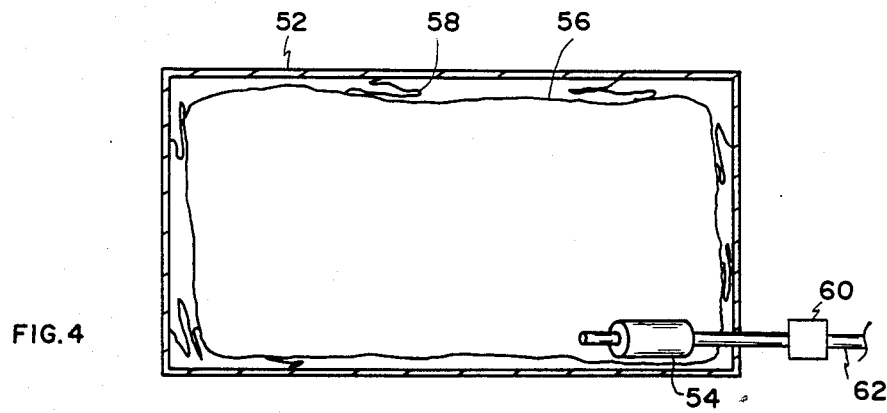
FIGS. 4 and 5 are diagrammatic views of a storage tank for chemically hardenable materials and a mechanical pumping arrangement for pumping the materials into a mixing device.

As seen in FIG. 1, an enclosure 2 for placing a mold 4 into space includes a cylindrical canister comprised of a pair of sections 6 and 8 which are secured together prior to launch and separated after reaching orbit. The mold is collapsed and folded in the canister or container on Earth and, subsequent to being placed in orbit, the mold 4 is formed and takes the shape of its desired configuration. A spherical shape is illustrated in FIG. 2; however, other shapes may be used as desired. Forming is accomplished by injection of chemically hardenable materials in the mold. As illustrated in FIG. 2, the container sections 6 and 8 separate and remain with the habitate to serve as a docking airlock for astronauts, or not, depending on the launch configuration. If desired, at least one of the container sections may serve to carry the pumps, storage tanks, and equipment needed for the chemicals. The container is separated in space by any of many known types of separation devices (springs, etc.).

In the embodiment shown in FIG. 3, a multi-layered spherical construction is illustrated with the multi-layered mold formed. The mold 4 includes mold layers 10, 12, 14, 16, 18, 20, and 21. A plastic filter insulating layer 22 is disposed between moldlayers 10 and 12, and insulating layers 24 and 26 are disposed between mold layers 12 and 14, and 16 and 18, respectively. Layers of reinforced epoxy 28 and 30 are disposed between layers 14 and 16, and 18 and 20, respectively. Structural reinforcing members 32 are positioned between layers 16 and 18 of the mold. Members 32 are an integral part of the mold and are foldable for enclosure in the mold in its collapsed position and extended in the inflated position of the mold. The portions of the structure which are not part of the hardened shell (the interior of layer 10, for example, in FIG. 3) are to be filled with a gas or liquid to provide for holding the shape of the old during the hardening or "setting" period for the filler materials in the shell.

To provide the space structure with means for electrically connecting external sensors and communication devices with the interior of the space structure, a conduit 34 is mounted in the layers of the mold during assembly thereof on the ground. The conduit extends from the interior 36 of the structure to the exterior thereof where communication devices 38 and sensors 40 are mounted. Power lines 42 are positioned in layers 22 and 30 of the filler materials and may include communications, data links, sensors, etc.

Figure 9:
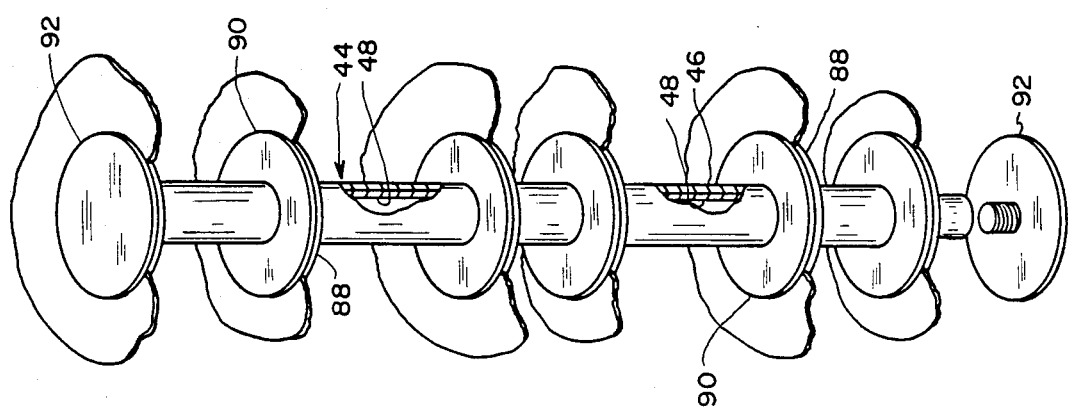
FIG. 9 is a pictorial view illustrating the reinforcing and spacing assembly used in the mold of the present invention.

To insure uniform layer structure formation, a plurality of structural reinforcement and spacing members 44 are disposed in the mold. A plurality of spacers 46 are provided in each layer of the mold and are respectively secured to each section 48 of reinforcing member 44 (FIGS. 3 and 9).

Figure 12:
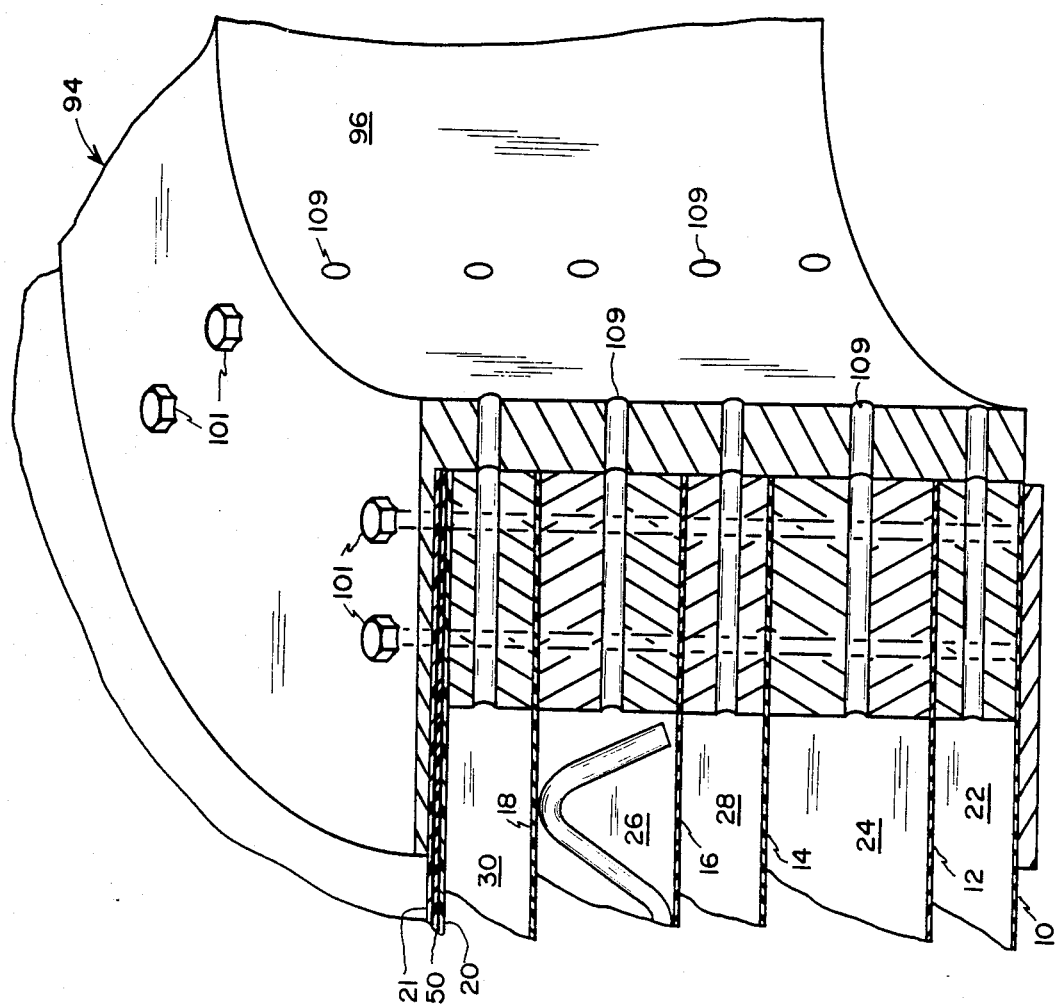
FIG. 12 is a partial pictorial view of the core assembly of FIG. 10, modified to receive the injector assembly for injecting the chemically hardenable materials into the mold.

To provide shock and impact resistance to the space structure, a layer of Kelver TM, or similar material 50 is disposed in between the outer layers 20 and 21 of the mold (FIGS. 3 and 12).

Also, if desired, a flexible metallic wire mesh or screen may be disposed between the layers. The metal should be sufficiently flexible for the mold to conform to the predetermined shapes after the injection of filler materials and the gas inflation processes is begun. This provides a metallic structural reinforcement for the shell structure.

Figure 5:
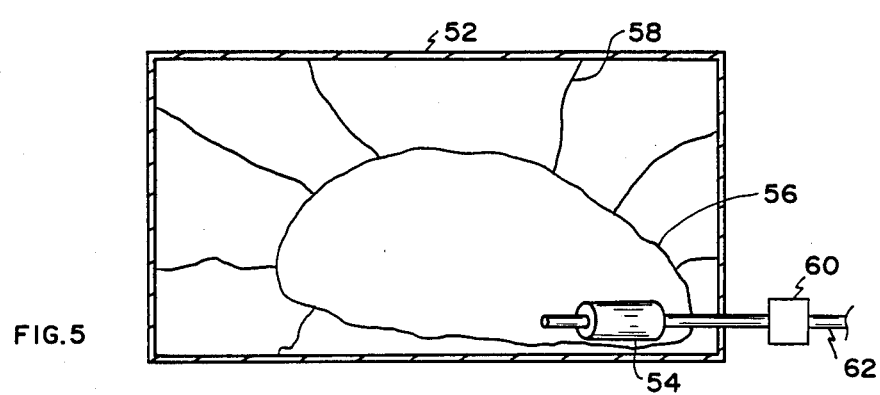

FIGS. 4 and 5 illustrate the means for mechanically pumping the filler materials into the mold. A full storage tank 52 is illustrated in FIG. 4 and is provided with a pump 54 which communicates with the interior of a collapsible container 56 which is secured in the interior of the container by tethers 58. A monitoring valve 60 is mounted in the discharge pipe 62 from the container to control flow of the filler material from the storage tank. FIG. 5 illustrates the container partially empty.

Figure 6:
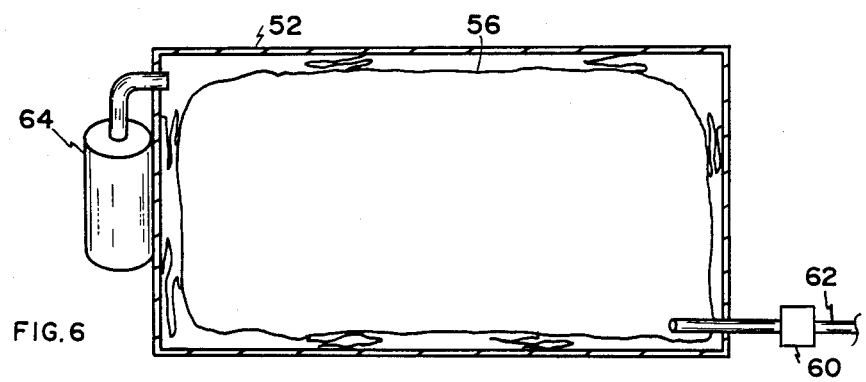
FIGS. 6 and 7 are views similar to FIGS. 4 and 5, respectively, wherein a gas pressure-pumping device is used to discharge the materials.
Figure 7:
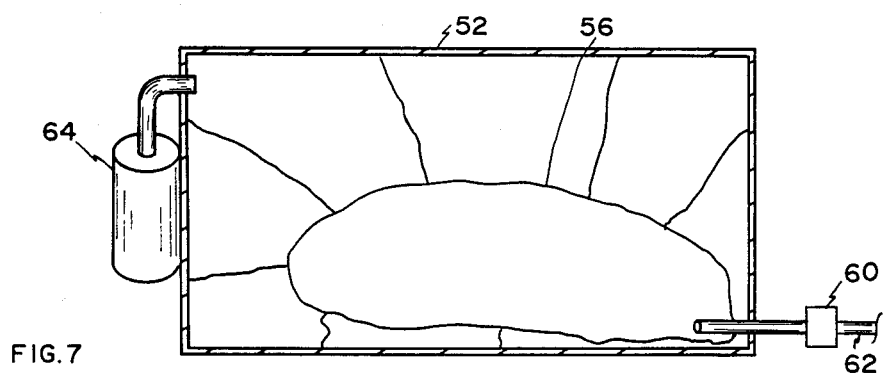

A gas-pressure pumping scheme is illustrated in FIGS. 6 and 7. In this pumping arrangement, a source of gas under pressure 64 communicates into storage tank 52 to apply pressure to container 56 to force the filler materials out of collapsible container 56 through monitoring valve 60 and discharge pipe 62. FIG. 7 illustrates the container partially empty.

Figure 11A:
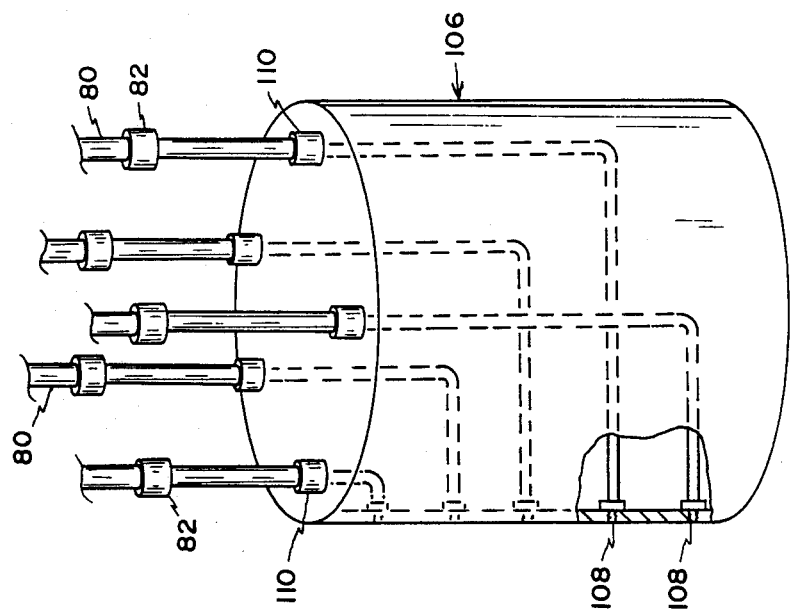
FIG. 11a is a pictorial view of an injector manifold.

A mixing device 66 is connected to the discharge pipe 62 of each storage tank to receive the filler materials therefrom for mixing thereof and for injecting the mixture into the mold form. The mixing device includes a mixing tank 68 having discharge lines 62 from the container secured thereto. A plurality of spaced, radially extending blades 70 are secured to shaft 72 of a motor 74 for rotation thereby. End bearings 76 and 78 support the shaft in the mixing tank. A discharge pipe or line 80 directs the mixed filler materials out of the mixing tank and into the mold. The flow of the filler materials is monitored by flow monitor valves 60 going into the mixing tank and discharge monitor/check valves 82 as the flow exits the mixing tank through discharge line 80 (FIGS. 11 and 11a).

As more clearly seen in FIG. 9, the reinforcing and spacing assembly 44 includes spacers 46 placed on a rod 48 in spaced relation. The spacers include flangs 88 and 90 at opposite ends thereof. A pair of end flanges 92 is secured to opposite ends of members 46 by being bolted into tapped holes in member 46. The mold layers are gripped between adjacent flanges, and the reinforcing and spacing assembly is glued and/or bolted together on Earth. The reinforcing members are distributed uniformly throughout the mold structure in order to ensure that the layers of filler materials have a uniform thickness where such uniformity is desired. If desired, the flanges may not be integral with the spacer but may be washers placed around rod 48 at the ends of each spacer.

Figure 10:
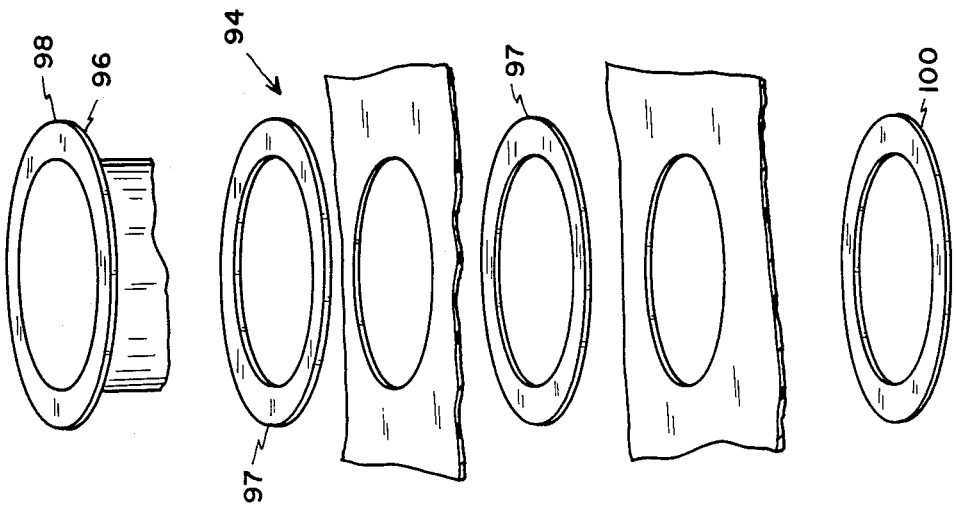
FIG. 10 is an exploded pictorial view of an interior-to-exterior connection assembly which may be used to make necessary interior-to-exterior connections through the shell assembly.

To provide a means for mounting interior-to-exterior structures in the shell, such as a hatchway, port, interlock or an interior-exterior structural member (FIGS. 10, 11, and 12), a layerd ring structure 94 is mounted through the mold assembly. The layered ring structure includes a cylindrical core member 96 having a flange 98 at the upper end thereof and a termination ring 100 at the lower end. A plurality of ring members 97 is positioned around the core member in spaced relation. The rings 97 are positioned so that adjacent rings secure a mold layer between them. Core member 96 and rings 97 are assembled into the prefabricated mold structure while on Earth. The rings may be secured to each mold layer by screws or by gluing. The complete core and ring assembly is secured together by bolts 101. Appropriate covers may be installed as required either before or after the mold has formed to its predetermined configuration.

Figure 11:
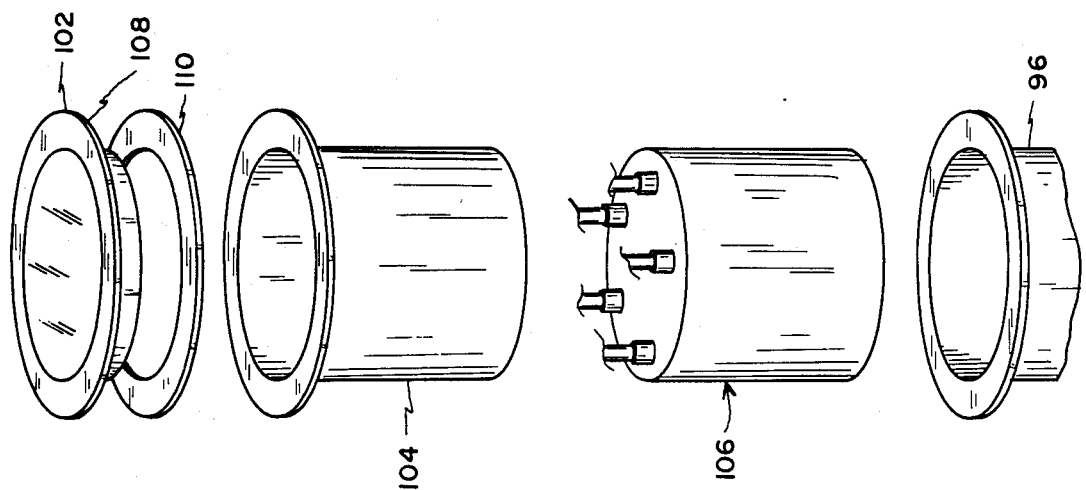
FIG. 11 is a diagrammatic, exploded pictorial view similar to FIG. 10 showing a porthole, airlock, or injector manifold for mounting in the interior-to-exterior assembly of FIG. 10.

FIG. 11 illustrates the use of core member 96 for receiving exterior-to-interior assemblies, such as a porthole 102, an airlock 104, or an injector assembly 106 for injecting the filler materials into the mold. When used as a porthole, sealed glass assemblies 108 and 110 are secured in spaced relation around core 96 at the inner and outer surface thereof.

To provide a means for injecting the hardenable chemicals into the mold, lines 80 from each mixing tank 68 are secured to manifold 106 (FIG. 11a). The manifold 106 is positioned in the core 96 of a modified ring structure 94 with lines 80 communicating between the layers of the mold through holes 108 provided through injector assembly 106 and holes 109 provided in rings 97. As seen in FIG. 12, injector assembly 106 is modified to include the holes 108 to receive the ends of the exit lines 80, and the ring members have been provided with holes 109. The manifold is to be left in the core after the injection process has been completed. The lines 80 into the manifold are disconnected (via a quick disconnect coupling 110) (FIG. 11) and an appropriate cover then installed over the core opening. To prevent backflow of the chemicals during the injection process, and while waiting for the chemicals to harden, lines 80 are provided with the monitor/check valves 82 as shown in FIG. 11a.

While the interior-to-exterior structure has been illustrated to be cylindrical, it is to be understood that other configurations may be restored to. Such configurations may be triangular, rectangular, oval, etc.

It is to be understood that, while a spherical structure utilizing multiple layers of mold materials and hardenable filler materials has been described, a structure using a single layer of hardenable materials may be restored to, if desired. The configuration may be any of many desirable configurations.

Figure 13:
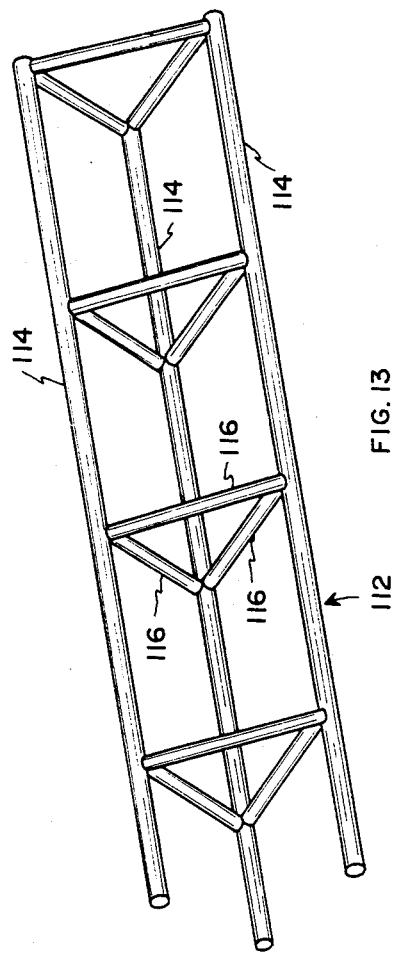
FIG. 13 is a pictorial view of a truss structure, made in accordance with the principles of the present invention, for supporting solar cells, communication antennas, and other space structures.
Figure 14:
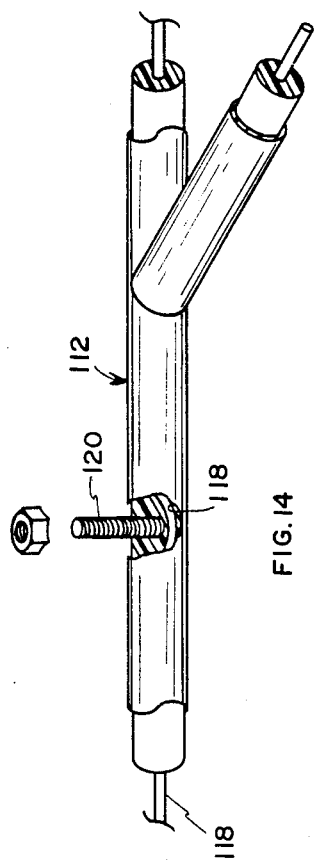
FIG. 14 is an enlarged pictorial view of the structure of FIG. 13 illustrating the joint between the structural tubular members and the manner in which mounting bolts and electrical cables are carried by the structure.
Figure 8:
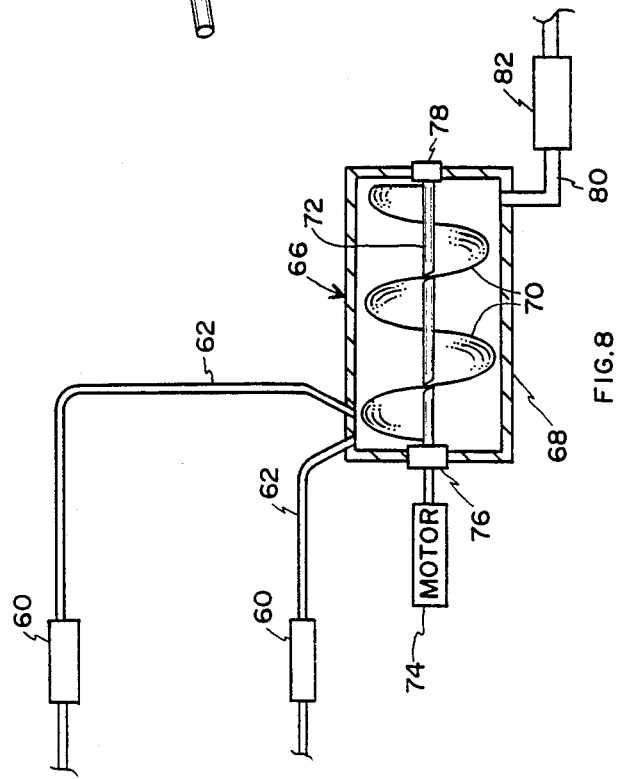
FIG. 8 is a diagrammatic elevational view of the mixing device for mixing the hardenable chemicals received from the storage tanks.

In the embodiment shown in FIGS. 13 and 14, the mold 112 is formed on Earth in the shape of tubes arranged for use as a structural member, such as an antenna or solar cell support structure. The structure includes a plurality of tubes 114 secured together by tubular struts 116. FIG. 14 illustrates the manner in which electrical cables 118 and mounting bolts 120 are secured in the structure.

The tubular plastic is formed on Earth with the electrical wiring built into the mold and the mounting bolts made part of the mold. The structure is made flexible and "folded" for launch. In space, the hardenable filler materials are injected at pressures sufficient for the mold to hold its shape until after it hardens. The structure may be attached to other frameworks, such as the habitat as described above, either before or after the chemicals harden in the structural member.

Figure 16:
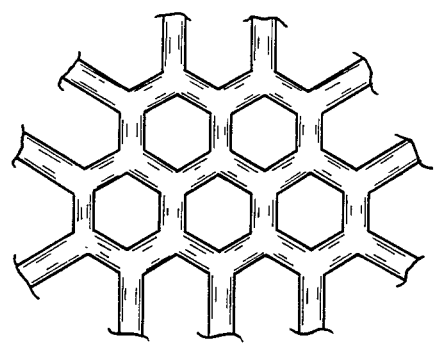
FIGS. 15, 16, and 17 are pictorial views illustrating barrel, honeycomb, and circular parabolic configurations which may be attained by utilizing the principles of the present invention.
Figure 17:
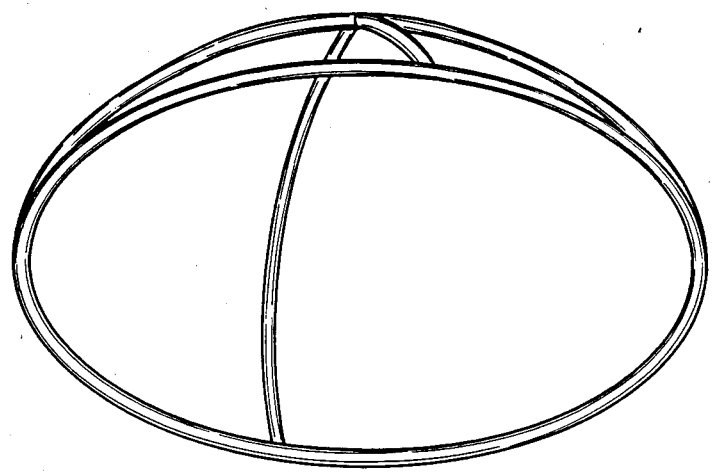
Figure 15:
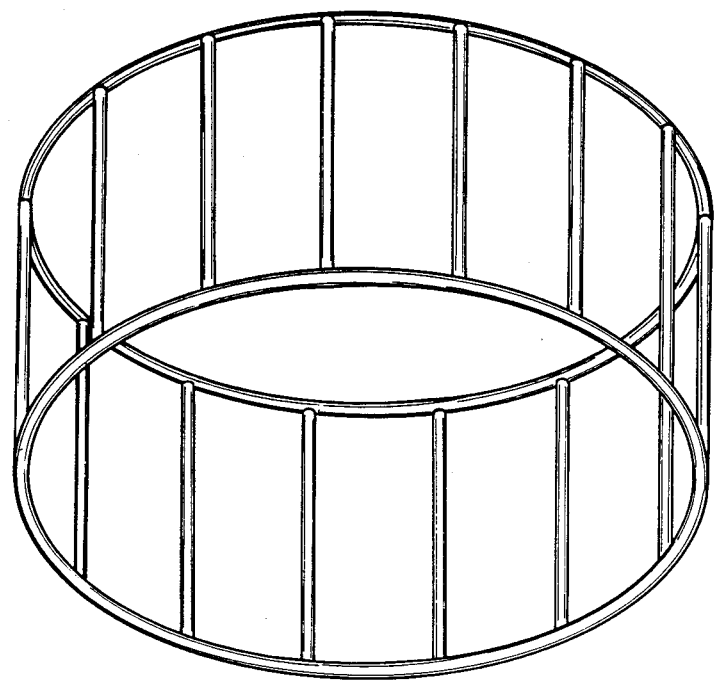

While the structural truss is illustrated in FIGS. 13 and 14 as having a triangular configuration, it is to be understood that other configurations may be restored to without departing from the scope of the invention. FIG. 15 illustrates a barrel structure, FIG. 16 illustrates a honeycomb-type of structure, and FIG. 17 illustrates a circular parabolic structure which may be formed according to the principles of the present invention.

It is to be understood that the filler materials used depend on the desired property:

Structural filler - rigidity, strength, hardness;
Insulating filler - heat, light, electricity;
Radition filler - radiation resistance;
Conduction filler - radio/microwave shielding; and
Impact filler - impact resistance (meteors).

The filler materials may be epoxy resins, polyurethane, latex, mylar, cement, ceramic mix, polyamide-imides, and the class of plastics known as ABS.

The mold may be made of plastic films, sheets, and fabrics (the sheets and fabric need not be plastic) and must be non-leaking. The mold is assembled on Earth by gluing, thermally sealing, or clamping many smaller pieces together. Mechanical interconnections for air, water, sewage, valves, airlocks, spouts, and other structures or fixtures may be attached to or constructed as part of the mold. The mold must be impervious, flexible, and non-elastic.

It is apparent that the apparatus of the present invention provides a means whereby the properties of space are utilized, specifically a vacuum and no effective gravity for orbiting bodies, for the construction of environmental habitats and/or protective shells and/or reinforcing structures for such things as equipment and people. The principles of the present invention allow single-piece fabrication in space without launching smaller pieces and assemblying them in space or launching large cumbersome structures which have been "beefed up" to withstand the stress of launch.

What is claimed is:

1. A space habitat disposed for erection in a non-gravitational space environment comprising:
   a container disposed for being placed in a space orbit;
   a flexible, expandable, impervious mold disposed for forming said habitat, said mold arranged in a collapsed, substantially folded relation in said container while on Earth, said container disposed for emplacing said mold in the space orbit to expose said mold to a space environment, said mold comprised of a plurality of layers of impervious, expandable continuous material;
   non-gas evolving diverse chemically hardenable filler means for injection between adjacent layers of said plurality of layers of said mold for forming said mold into said habitat; and
   said habitat forming an inner hollow core formed by the inner layer of said mold, said hollow core disposed for receiving a breathable gas therein, the remaining layers of said mold having said diverse hardenable chemicals therebetween, forming concentric, mutually enclosing, continuous shells of structural, thermally insulating, radiation-resistant, conductive and impact-resistant materials between said layers of said mold.

2. An apparatus as set forth in claim 1 including passage means extending through said mold in communication with said interior hollow core and said space environment, said passage means having closure means associated therewith.

3. An apparatus as set forth in claim 2 wherein said space habitat includes passageways disposed therein, said passageways having electrical conduits therein for electrically connecting electrically powered components carried by or on said habitat.

4. An apparatus as set forth in claim 3 wherein the outer layer of said sheets is provided with an impact-resistant covering.

5. An apparatus as set forth in claim 4 wherein said sheets are plastic.

6. An apparatus as set forth in claim 5 wherein said passage means includes hatchways to permit passage into and out of said space habitat.

7. An apparatus as set forth in claim 6 wherein said passage means includes windows.

8. An apparatus as set forth in claim 7 wherein said passage means is defined by a layered ring structure including a cylindrical core having flanges at the ends thereof and a plurality of ring members mounted around said cylindrical core in secured relation with each said shell of chemically hardenable material, said closure means disposed at the ends of said core member for sealing relation therewith.

9. An apparatus as set forth in claim 8 including storage and dispensing means for storing and dispensing said hardenable filler material subsequent to said mold being placed in a space orbit.

10. An apparatus as set forth in claim 9 wherein said storage and dispensing means includes a plurality of tanks for separately storing said filler materials.

11. An apparatus as set forth in claim 10 including mixing means connected to each said tank for receiving said filler materials from each said storage tank for mixing thereof and for injecting said mixed materials into said mold for hardening therein.

12. An apparatus as set forth in claim 11 including spacers arranged along said layers of said mold to provide for uniform thickness of the filler materials between said layers.

13. An apparatus as set forth in claim 12 wherein said mold includes structural members positioned between predetermined layers.

14. An apparatus as set forth in claim 13 wherein said mold includes conduits extending transversely through said layers and sealed to said layers, said conduits having electrical wiring disposed therein.

* * * * *